United States Patent
Roberts et al.

(10) Patent No.: US 9,562,443 B2
(45) Date of Patent: Feb. 7, 2017

(54) ELECTRICAL CONDUCTOR PATHS

(71) Applicant: ROLLS-ROYCE PLC, London (GB)

(72) Inventors: David V. Roberts, Bristol (GB); Alison Jane McMillan, Staffordshire (GB); Stephen John Booth, Derby (GB)

(73) Assignee: ROLLS-ROYCE plc, London (GB)

( * ) Notice: Subject to any disclaimer, the term of this patent is extended or adjusted under 35 U.S.C. 154(b) by 543 days.

(21) Appl. No.: 14/204,780

(22) Filed: Mar. 11, 2014

(65) Prior Publication Data

US 2014/0193249 A1 Jul. 10, 2014

Related U.S. Application Data

(63) Continuation of application No. 12/852,067, filed on Aug. 6, 2010, now abandoned.

(30) Foreign Application Priority Data

Aug. 19, 2009 (GB) .................................. 0914502.0

(51) Int. Cl.
| | | |
|---|---|---|
| *F01D 5/14* | (2006.01) | |
| *F01D 25/24* | (2006.01) | |
| *B29C 70/88* | (2006.01) | |
| *B29D 99/00* | (2010.01) | |
| *F01D 5/28* | (2006.01) | |

(Continued)

(52) U.S. Cl.
CPC ............. *F01D 25/24* (2013.01); *B29C 70/882* (2013.01); *B29D 99/0025* (2013.01); *F01D 5/282* (2013.01); *F01D 17/02* (2013.01); *B29L 2031/08* (2013.01); *B29L 2031/7504* (2013.01); *F05D 2300/507* (2013.01); *Y02T 50/672* (2013.01); *Y02T 50/673* (2013.01)

(58) Field of Classification Search
CPC ..................... F01D 5/12–5/288; B29C 70/882; B29C 70/885; B29L 2031/08; B29L 2031/082; F05D 2300/60; F05D 2300/601; F05D 2300/6012
See application file for complete search history.

(56) References Cited

U.S. PATENT DOCUMENTS

| | | |
|---|---|---|
| 4,752,415 A | 6/1988 | Iwaskow et al. |
| 5,314,309 A | 5/1994 | Blakeley et al. |

(Continued)

FOREIGN PATENT DOCUMENTS

| | | |
|---|---|---|
| EP | 1 816 704 A1 | 8/2007 |
| GB | 2 218 473 A | 11/1989 |

(Continued)

OTHER PUBLICATIONS

European Search Report dated Dec. 2, 2010 issued in European Patent Application No. 10172116.5.

(Continued)

*Primary Examiner* — Christopher Verdier
*Assistant Examiner* — Brian O Peters
(74) *Attorney, Agent, or Firm* — Oliff PLC

(57) ABSTRACT

A component, for example an aerofoil vane or other gas path structure in a gas turbine machine such as a gas turbine engine, in which an insulated electrical conductor path is embedded structurally integrally, and in which electromagnetic shielding, for the embedded electrical conductor path is provided structurally integrally.

14 Claims, 3 Drawing Sheets

(51) Int. Cl.
*F01D 17/02* (2006.01)
*B29L 31/08* (2006.01)
*B29L 31/00* (2006.01)

(56) References Cited

U.S. PATENT DOCUMENTS

| | | |
|---|---|---|
| 5,414,211 A | 5/1995 | Chan |
| 5,925,275 A * | 7/1999 | Lawson ............... B64D 15/12 219/543 |
| 5,951,254 A | 9/1999 | Sikorski et al. |
| 6,031,214 A | 2/2000 | Bost et al. |
| 6,218,647 B1 | 4/2001 | Jones |
| 7,391,622 B2 | 6/2008 | Marshall et al. |
| 7,789,620 B2 | 9/2010 | Vontell, Sr. et al. |
| 2010/0329836 A1 | 12/2010 | Edmondson |
| 2011/0168431 A1 | 7/2011 | Schneweis et al. |

FOREIGN PATENT DOCUMENTS

| | | |
|---|---|---|
| GB | 2 437 173 A | 10/2007 |
| JP | A-2007-294828 | 11/2007 |
| WO | WO 2006/051384 A1 | 5/2006 |

OTHER PUBLICATIONS

British Search Report date Nov. 25, 2009 issued in British Patent Application No. 0914502.0.

* cited by examiner

ELECTRICAL CONDUCTOR PATHS

This is a Continuation of application Ser. No. 12/852,067 filed Aug. 6, 2010, now abandoned, which claims the benefit of British Application No. 0914502.0 filed Aug. 19, 2009. The disclosure of the prior applications is hereby incorporated by reference herein in its entirety.

The present invention relates to the provision of electrical conductor paths.

In conventional instrumentation, for example in a gas turbine engine for aircraft, the power supply or signal to or from a measuring device is carried electrically along a wire. At least in the case that the wire carries a high frequency alternating current, the wire must be shielded to suppress unwanted electromagnetic effects arising from the current. Shielding may also be needed to protect the wire from electromagnetic effects due to currents flowing elsewhere in the engine or otherwise in the vicinity, for example to avoid falsification of measurement results.

Where the measuring device is located in a relatively inaccessible place in the engine, it may be convenient for the wire carrying the signal to be routed along or through an aerofoil vane, or other gas path structure of the engine. In this case, conventionally, the wire has either been passed through a hole in the structure concerned, or attached to the side of the structure concerned. Such conventional arrangements can give rise to disadvantages.

According to the present invention there is provided a component, for example an aerofoil vane or other gas path structure in a gas turbine machine, e.g. a gas turbine engine for instance for aircraft, or a gas turbine generator, in which an insulated electrical conductor path is embedded structurally integrally, and in which electromagnetic shielding for the embedded electrical conductor path is provided structurally integrally.

The conventional arrangements mentioned above generally involve post-production modification of a component to provide accommodation for a wire for carrying a signal.

In contrast, in embodiments of the present invention, an electrical conductor path is embedded structurally integrally into the component concerned in the course of production of the component, thus forming an intrinsic feature of the component. This enables embodiments of the invention to avoid problems associated with conventional arrangements, to maintain structural integrity of the component concerned, which is particularly important when the component is an aerofoil vane or other gas path structure in a gas turbine machine, and to provide other significant advantages. In embodiments of the invention the embedded electrical conductor path may be used to carry a signal or to carry power. Of course, respective embedded electrical conductor paths may be provided, in a component concerned, for carrying signal(s) and power. For example, turbomachinery applications of embodiments of the invention could include the transmission of driving electrical power, via an embedded electrical conductor path, across a stator vane span to the stator assembly of a radio telemetry transformer. Preferably, the power feed is at radio frequencies so that transformer operation is independent of rotational speed. Disturbances to this power transmission arising from electromagnetic interference could generate unwanted signal noise. Similarly it is desirable to minimise electromagnetic interference arising in other neighbouring circuits as a result of the power transmission. The electromagnetic shielding provided in accordance with the invention can avoid or minimise such electromagnetic interference problems. A further example of transmission of power through embedded structural conductor paths as provided in accordance with the invention is the supply of current to strain gauge bridges provided on turbomachinery components.

Embodiments of the present invention avoid problems associated with a conventional post-production provision of wiring, e.g. possible distortion of accuracy of a signal carried by the wire, for example from a measuring device, or electromagnetic effects due to currents flowing elsewhere, and inconvenient increase in the cross-sectional area requirement in order to accommodate shielding for the wire. There is also avoided the problem arising with a conventional arrangement in which a hole has to be provided post-production in the component for the wire, in that if a possibly suitable hole is not incidentally already present in the structure concerned (rarely the case), the hole has to be specifically machined, which costs time and money for the machining and could affect the component in terms of structural integrity—the larger the hole needed the greater the possible impact on integrity—and therefore introduce a need for additional engineering analysis time.

There is also avoided the problem arising with a conventional arrangement in which the wire is attached to the outside of the structure, rather than passed through a hole, in that it must then be protected from the gas path (gas flow, temperature, etc) and the obstruction that it causes the gas path must be taken into account.

In embodiments of the invention, in cases in which the conductor path is embedded in a component, such as an aerofoil vane, primarily of an electrically conductive material, then the electromagnetic shielding may be inherently provided by that material.

Provision of further shielding would not be required.

In embodiments of the invention, if the component, such as an aerofoil vane for a gas turbine machine, is made of a non-conducting (electrically insulating) fibre reinforced plastic material, selected non-conducting fibres may be substituted by electrically conducting fibres or filaments such as threads or wires, which can then be used as the electrical conductor path to carry a signal or power or to provide the function of electromagnetic shielding. This technique of embedding the electrical conductor path by integrally weaving the electrical conductor path into the structure of the insulating fibre reinforced plastic material can ensure high structural integrity of the component concerned.

In other embodiments of the invention, where the component is made of a non-conducting fibre or fibre-resin matrix, some fibres may be coated (sized) with a conductive coating. Alternatively thin foil conductors may be included with the fibre tows or used to wrap the fibre tows. The coated or wrapped fibre tows can then be used as the electrical conductor path to carry a signal or power or to provide the function as electromagnetic shielding. Again, this technique of embedding the electrical conductor path effectively by integrally weaving the electrical conductor path (e.g. coated or wrapped on insulating fibres) into the structure of the insulating fibre reinforced plastic material can again ensure high structural integrity of the component concerned.

In further embodiments of the invention, if the structure is made of a non-conducting fibre reinforced plastic material, then one or more plies could be laid up in such a way that a channel is left into which one or more electrically conducting filaments threads or wires are placed, which could then be used as electrical conductor path to carry a signal or power or to function as electromagnetic shielding. The threads or wires would then become embedded into the matrix material of the fibre reinforced plastic material and an integral part of the structure. There can again be ensured high structural integrity of the component concerned.

In further embodiments of the invention, if a component precursor structure is made of a fibre reinforced plastic material, then one or more plies could be laid up in such a way that a channel is left, into which one or more hollow tubes or other passageway defining members may be placed, into which one or more wires or shielded wires may be inserted at the conclusion of manufacture or after manufacture. The hollow tube or other passageway defining member then becomes embedded into the matrix material and becomes an integral part of the structure. A suitable choice of tube material would mean that the impact on the structural integrity of the structure would be minimised. Furthermore, it would for example be possible to manufacture each aerofoil vane in a set—or each vane precursor—in the same way, and only use the tube to carry a wire for that or those vanes where this is needed.

In other embodiments of the invention, if the component is made of a fibre reinforced plastic material, but has a total or partial covering of metallic erosion protection, this metallic protection could be used as the electromagnetic shielding. The metallic erosion protection is then to be electrically insulated from the signal carrying (or power carrying) electrical conductor path (e.g. wire) by the non-conducting structural material. The shielding may also be provided by a metallic or conductive coating or paint, the main purpose of which is for erosion protection, or other surface treatment, or appearance.

In further embodiments of the invention, if the structure is made of a fibre reinforced plastic material, wherein the fibres have some electrical conductivity (for example carbon fibres), then this conductivity may be sufficient to provide the needs of shielding. The electrical insulation is provided by interposing a ply (or plies) or coating of non-conducting material between the shielding ply (or plies) and the signal or power conductor.

In further embodiments of the invention, if the structure is made of a fibre reinforced plastic material, wherein the fibres have some electrical conductivity (for example carbon fibres), then this conductivity may be sufficient to carry a signal or power. The electrical insulation is provided by interposing a ply (or plies) or coating of non-conducting (electrically insulating) material between the shielding ply (or plies) and the signal or powercarrying conductor.

In other embodiments of the invention, if the structure is made of a fibre reinforced plastic material, wherein the fibres have insufficient electrical conductivity to perform as a shielding, and there is no metallic erosion protection, or the metallic erosion protection is only partial, then full shielding could be obtained by including a thin ply of metal foil or mesh in the lay-up of the fibre reinforced plastic material.

Reference is made by way of example to the accompanying drawings, in which.

Figure 1:
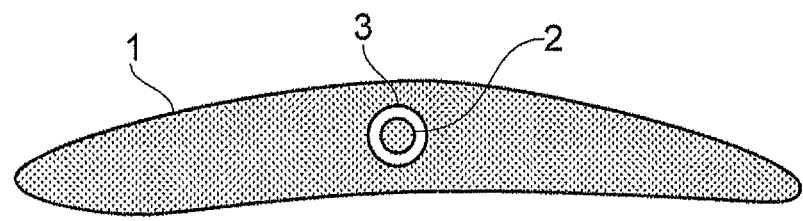
FIG. 1 shows a schematic cross section of a component having an electrically conducting structure.

FIG. 1 illustrates a component in accordance with an embodiment of the invention, in this case an aerofoil vane of a gas turbine engine, having an electrically conducting, e.g. metal, structure 1 within which there is embedded structurally integrally an electrical conductor path 2, for example a wire, with a structurally integrally embedded electrical insulator 3, insulating the conductor path 2 from the conducting structure 1. The electrical conductor path 2 is embedded structurally integrally into the structure in the course of production of the component, as is the electrical insulator 3, thus forming intrinsic features of the component as manufactured. In this embodiment the conducting structure 1 itself provides for electromagnetic shielding of the conductor path 2. The conductor path 2 may thus safely carry a signal, for example from a measuring device or sensor, or carry power, without further shielding measures.

Figure 2:
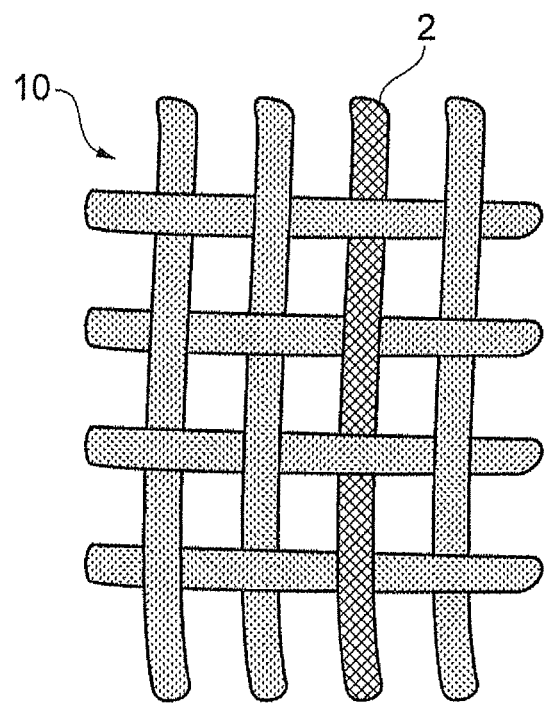
FIG. 2 shows a schematic view of part of a fibre ply of a component having a fibre reinforced plastic material structure.

FIG. 2 shows a schematic view of part of a fibre ply of a component embodying the present invention having a fibre reinforced plastic material structure. Typically, in such a structure, a number of plies, each a weave of fibres, are laid up in appropriate manner and bonded together to an integral structure with a plastic matrix material or resin. In the case illustrated in FIG. 2 the fibres 10 are non-conducting (electrically insulating) fibre. However one or more fibres are substituted by electrically conducting fibres or filaments 2, for example wires, which can then be used as the electrical conductor path to carry a signal or power or to provide the function as electromagnetic shielding. This technique of embedding the electrical conductor path by integrally weaving into the structure of the insulating fibre reinforced plastic material in the course of production of the component can ensure high structural integrity of the component concerned.

Figure 3:
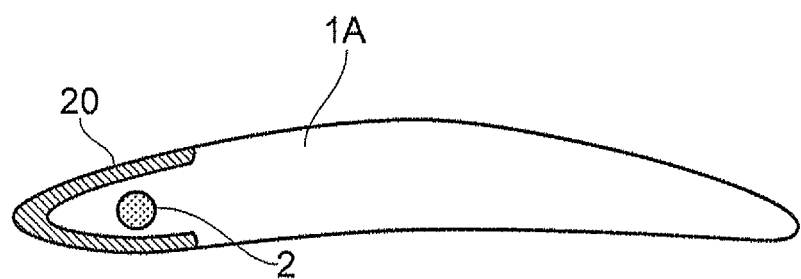
FIG. 3 shows a schematic cross section of a component having an electrically insulating structure.

FIG. 3 shows a schematic cross section of a component in accordance with the invention, in this case an aerofoil vane of a gas turbine engine, having an electrically insulating structure 1A, for example of a fibre reinforced plastic material. The aerofoil vane is provided in this case with a metallic erosion resistant coating or strip 20, at least at a vane edge which is likely to be subject to erosion in operation of the engine, as is shown in the Figure. Of course the vane may be provided with a more extensive or total covering of metallic erosion protection. In the embodiment, by suitable positioning of the electrical conductor path 2, embedded structurally integrally in the insulator structure 1A in the course of production of the component, to be screened at least in part by the metallic erosion resistant coating or strip 20, this metallic protection can also provide the electromagnetic shielding for the conductor path 2, so that no additional measures are needed. The metallic erosion protection 20 is electrically insulated from the signal or power carrying wire by the non-conducting structural material 1A. The shielding 20 may also be provided by a metallic or conductive coating or paint, the main purpose of which may be for erosion protection, but may otherwise be for surface treatment, or for appearance.

Figure 4:
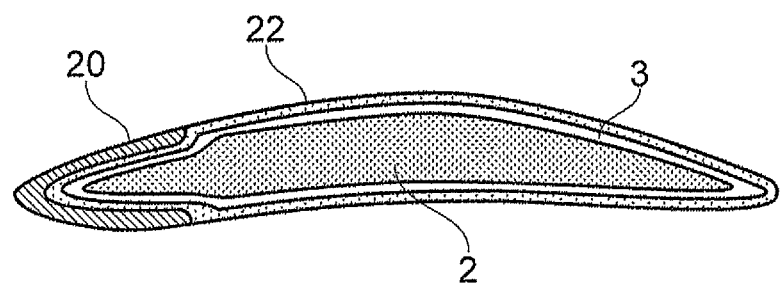
FIG. 4 shows a schematic cross section of a component having electrically conducting and electrically insulating structure.

FIG. 4 shows a schematic cross section of a component in accordance with the invention, in this case an aerofoil vane of a gas turbine engine, having electrically conducting and electrically insulating structure. In this embodiment the structure comprises an electrically conducting core 2 of a fibre reinforced plastic material wherein the fibres have some electrical conductivity (for example carbon fibres), which is sufficient to provide an electrical conductor path for carrying a signal and in some cases for carrying power. The core 2 is surrounded by a ply or plies or coating of non-conducting (electrically insulating) material 3. In turn the non-conducting material 3 is surrounded by electrically conducting ply or plies of a fibre reinforced plastic material 22 wherein the fibres have some electrical conductivity (for example carbon fibres), which is sufficient to provide an electromagnetic shielding function. Thus, the insulator 3 is interposed between the shielding ply (plies) 22 and the signal-carrying conductor (ply or plies) 2. In the embodiment illustrated in FIG. 4, a metallic erosion resistant coating or strip 20 is also provided.

Figure 5:
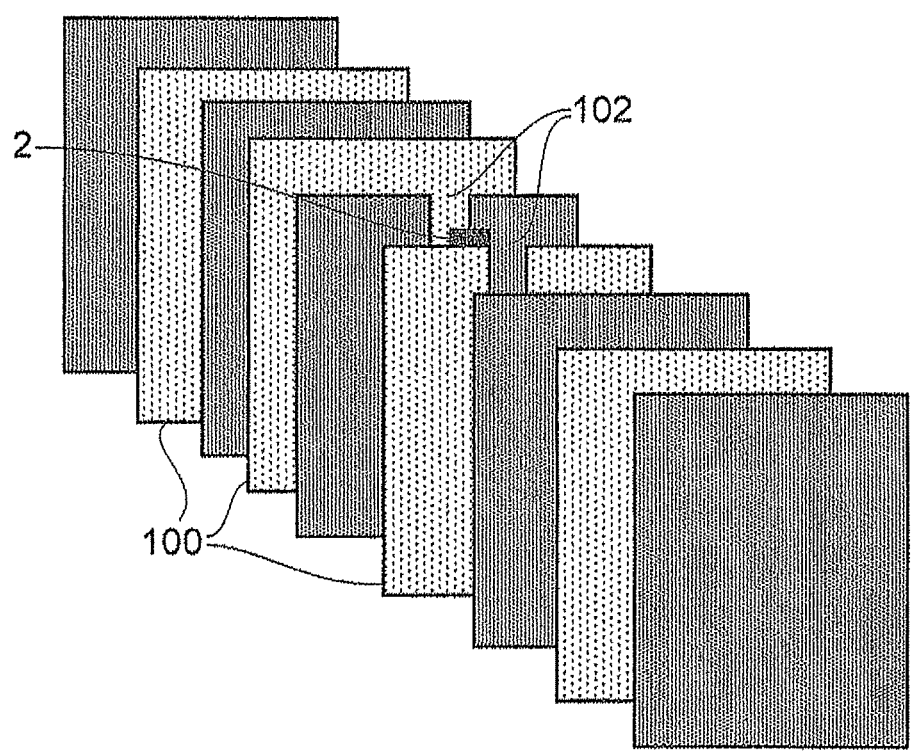
FIG. 5 schematically illustrates, in an exploded view, an arrangement of plies for a component having a fibre reinforced plastic material structure.

FIG. 5 schematically illustrates, in an exploded view, an arrangement for plies for a component in accordance with the invention, for example an aerofoil vane of a gas turbine engine, having a fibre reinforced plastic material structure. In this embodiment the component, or a component precursor structure, is made of a fibre reinforced plastic material in which one or more of the plies 100 are laid up in such a way that there is a gap 102 between plies (seen in the centre of the exploded array of plies in the Figure) which leaves a channel, into which one or more hollow tubes or other passageway defining members (not shown) may be placed, into which one or more electrical conductor paths 2, for example wires or shielded wires, may be inserted at conclusion of manufacture or after manufacture of the component is completed. The hollow tube or tubes then become embedded into the matrix material fibre reinforced plastic material structure and becomes an integral part of the structure. A suitable choice of tube material can ensure that structural integrity of the structure is not tangibly affected.

Furthermore, in this way it is possible for example to manufacture each aerofoil vane in a set in the same way, i.e. each with a channel or tube for an electrical conductor path, and only use the tube to carry an electrical conductor path, e.g. wire, for that or those vanes where this is needed.

Thus it will be appreciated that embodiments of the present invention provide for embedded electrical conductor paths integral to the component concerned, for example an aerofoil vane or other gas path structure of a gas turbine machine such as a gas turbine engine, for instance for connection of instrumentation, in such a manner the gas path distortion is avoided. The electrical conductor paths are integrated and form an embedded or intrinsic part of the component and contribute to, or do not significantly adversely affect, the strength of the component. The integral structure of components in accordance with embodiments of the invention supports the electrical conductor paths so permitting smaller conductive cables, wires or threads to be used, which reduces parasitic weight.

Some embodiments of the invention permit production parts, i.e. component precursors, to be instrument ready should the need arise.

Conductive fibres providing conductive paths in some embodiments of the inventions may be of the same nature as the structural fibres (eg carbon filaments) used in the composite component concerned, in which case insulation may be achieved by coating individual fibres with a non-conducting material. Alternatively, in a non-conducting matrix with non-conducting reinforcement, conductivity of reinforcement fibres might be achieved by coating with a conductive material.

Although embodiments of the present invention as described above primarily relate to turbomachinery such as gas turbine engines, some embodiments of the invention may find application in other fields.

For example, the layout of components in modern electronic devices (e.g. computers, televisions, washing machines etc) has to be specifically designed from the point of view of electromagnetic shielding. This is particularly an issue in very compact electronics, where space is a prime concern (for example on a mother-board for a mobile phone, PDA, or even within a chip). Fibre reinforced plastics provide a strong, lightweight solution for casings for such objects, and potential for the casing to form a part of an electrical circuit in similar manner as outlined in embodiments described above in connection with gas turbine engines. There is even potential to embed active electronic components within the lay-up of plies of the fibre reinforced plastics, at least so long as the plastic matrix material cure temperature is below the maximum for the electronic components.

The invention claimed is:

1. An aircraft component comprising:
an insulated electrical conductor path that is embedded structurally integrally, wherein
electromagnetic shielding for the embedded electrical conductor path is provided structurally integrally to suppress electromagnetic effects between the embedded electrical conductor path and other electrical conductor paths in the aircraft,
the aircraft component is formed of a fiber-reinforced composite material,
the insulated electrical conductor path and the electromagnetic shielding are integrated into the structure of the composite material,
the structural integrity of the composite material is maintained when the insulated electrical conductor path and the electromagnetic shielding are integrated, and
the insulated electrical conductor path and the electromagnetic shielding are integrally woven into the structure of the composite material.

2. An aircraft component as claimed in claim 1, wherein the aircraft component is a gas path structure of a gas turbine machine.

3. An aircraft component as claimed in claim 2, wherein the aircraft component is an aerofoil vane of a gas turbine machine.

4. An aircraft component as claimed in claim 1, wherein the fiber-reinforced composite material comprises plies, each ply comprising a weave of fibers, and a matrix material in which the plies are embedded.

5. An aircraft component as claimed in claim 4, wherein each of the plies of the fiber reinforced plastic structure comprises a weave of electrically insulating fibers, and wherein an electrically insulating fiber is substituted by an electrically conducting fiber integrally woven into a predetermined ply, the electrically conducting fiber thereby providing the electrical conductor path or the electromagnetic shielding.

6. An aircraft component as claimed in claim 4, wherein each of the plies of the fiber reinforced plastic structure comprises a weave of electrically insulating fibers, and wherein an electrically insulating fiber is provided with an electrically conducting covering integrally woven with the fiber into a predetermined ply, the fiber having the electrically conducting covering thereby providing the electrical conductor path or the electromagnetic shielding.

7. An aircraft component as claimed in claim 4, wherein one or more plies each comprising a weave of electrically insulating fibers, are laid up in such a way that a channel is provided in which one or more electrically conducting members are embedded, thereby providing the electrical conductor path and/or the electromagnetic shielding.

8. An aircraft component as claimed in claim 4, wherein at least some of the plies are of fibers having some electrical conductivity, such that they provide the electrical conductor path and/or the electromagnetic shielding.

9. An aircraft component as claimed in claim 8, wherein plies of fibers having some electrical conductivity provide both the electrical conductor path and the electromagnetic shielding, the plies of the electrical conductor path and the plies of the electromagnetic shielding being electrically insulated from one another.

10. An aircraft component as claimed in claim 9, wherein the plies of the electrical conductor path and the plies of the electromagnetic shielding are electrically insulated from one another by a ply or plies of electrically insulating fibers.

11. An aircraft component as claimed in claim 1, comprising a conductive surface coating which provides electromagnetic shielding.

12. An aircraft component as claimed in claim 11, wherein the aircraft component is a gas path structure of a gas turbine machine, and the conductive surface coating is an erosion protection coating on the gas path structure.

13. A precursor of an aircraft component as claimed in claim 1, having a fiber reinforced plastic structure comprising plies, each ply comprising a weave of fibers, and a matrix material in which the plies are embedded, wherein one or more plies each comprising a weave of electrically insulating fibers, are laid up in such a way that a channel is provided in which there is embedded one or more passageway defining members, providing passageways in the completed precursor, into which passageways one or more electrically conducting members may be subsequently introduced to provide the electrical conductor path and/or the electromagnetic shielding.

14. A gas turbine machine comprising an aircraft component as claimed in claim 1.

* * * * *